US009032939B2

(12) United States Patent
Glugla et al.

(10) Patent No.: US 9,032,939 B2
(45) Date of Patent: May 19, 2015

(54) METHOD FOR CONTROLLING A VARIABLE CHARGE AIR COOLER

(75) Inventors: Chris Paul Glugla, Macomb, MI (US); Charles A. Cockerill, Brighton, MI (US); Shuya Shark Yamada, Novi, MI (US); Phil Andrew Fabien, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/589,942

(22) Filed: Aug. 20, 2012

(65) Prior Publication Data

US 2014/0048048 A1 Feb. 20, 2014

(51) Int. Cl.
*F02B 33/00* (2006.01)
*F02M 15/00* (2006.01)
*F28F 27/02* (2006.01)
*F02B 29/04* (2006.01)
*F02M 35/08* (2006.01)
*F02D 23/00* (2006.01)
*F02D 41/00* (2006.01)
(Continued)

(52) U.S. Cl.
CPC ......... *F02B 29/0418* (2013.01); *F02B 29/0493* (2013.01); *F02M 35/1038* (2013.01); *F02M 35/10393* (2013.01); *F02B 29/0437* (2013.01); *F02M 25/0707* (2013.01); *F02M 25/0713* (2013.01); *F02M 35/088* (2013.01); *F02D 23/00* (2013.01); *F02D 2009/0272* (2013.01); *F02D 41/0002* (2013.01); *F02D 2041/0015* (2013.01); *F02D 2200/0402* (2013.01); *F02D 2200/0418* (2013.01); *Y02T 10/146* (2013.01); *Y02T 10/144* (2013.01); *Y02T 10/42* (2013.01)

(58) Field of Classification Search
CPC ............. F02B 29/0475; F02B 29/0493; F02B 29/0443; F02B 29/0462; F01P 2060/02; F02M 15/06; F02M 31/20; F02M 21/00; F01M 13/022; B60H 1/18; F28D 1/024; F28F 27/02; A23L 3/22
USPC .................................................. 123/540, 542
See application file for complete search history.

(56) References Cited

U.S. PATENT DOCUMENTS 4,997,033 A * 3/1991 Ghiani et al. .................... 165/67
5,671,806 A * 9/1997 Schmalzried ................... 165/81
(Continued)

FOREIGN PATENT DOCUMENTS

EP 1923551 A2 11/2007
EP 2161430 A1 3/2010

OTHER PUBLICATIONS

Cockerill, Charles A. et al., "Charge Air Cooler Control System and Method," U.S. Appl. No. 13/567,979, filed Aug. 6, 2012, 33 pages.
(Continued)

*Primary Examiner* — Stephen K Cronin
*Assistant Examiner* — Charles Brauch
(74) *Attorney, Agent, or Firm* — Julia Voutyras; Alleman Hall McCoy Russell & Tuttle LLP

(57) ABSTRACT

Embodiments for a charge air cooler are provided. In one example, an engine method comprises increasing intake air flow velocity through a charge air cooler in response to an estimated condensation formation value within the charge air cooler. In this way, condensation accumulation within the charge air cooler may be prevented.

20 Claims, 7 Drawing Sheets

(51) Int. Cl.
*F02M 35/10* (2006.01)
*F02M 25/07* (2006.01)
*F02D 9/02* (2006.01)

(56) References Cited

U.S. PATENT DOCUMENTS

| | | | |
|---|---|---|---|
| 6,394,076 B1 * | 5/2002 | Hudelson | 123/540 |
| 7,257,950 B2 | 8/2007 | Iwaszkiewicz | |
| 7,621,128 B2 | 11/2009 | Czarnowski et al. | |
| 7,828,044 B2 | 11/2010 | Hagberg et al. | |
| 8,191,366 B2 | 6/2012 | Taylor | |
| 2004/0079079 A1 * | 4/2004 | Martin et al. | 60/605.2 |
| 2007/0107425 A1 * | 5/2007 | Appleton | 60/599 |
| 2007/0114013 A1 * | 5/2007 | Augenstein et al. | 165/174 |
| 2008/0028757 A1 * | 2/2008 | Eitel et al. | 60/311 |
| 2008/0264619 A1 * | 10/2008 | Velte et al. | 165/167 |
| 2008/0302327 A1 | 12/2008 | Dahl et al. | |
| 2009/0007857 A1 * | 1/2009 | Esau et al. | 123/41.29 |
| 2009/0013977 A1 * | 1/2009 | Brecheisen, II | 123/563 |
| 2009/0050117 A1 * | 2/2009 | Tai et al. | 123/542 |
| 2010/0050997 A1 * | 3/2010 | Huber et al. | 123/563 |
| 2010/0077995 A1 * | 4/2010 | Buia et al. | 123/542 |
| 2011/0000469 A1 * | 1/2011 | Lauberts et al. | 123/564 |
| 2011/0107760 A1 * | 5/2011 | Quinn et al. | 60/599 |

OTHER PUBLICATIONS

Glugla, Chris Paul et al., "Method for Controlling a Variable Charge Air Cooler," U.S. Appl. No. 13/590,023, filed Aug. 20, 2012, 41 pages.

Buckland, Julia Helen et al., "Method for Controlling a Variable Charge Air Cooler," U.S. Appl. No. 13/590,072, filed Aug. 20, 2012, 41 pages.

* cited by examiner

METHOD FOR CONTROLLING A VARIABLE CHARGE AIR COOLER

FIELD

The present disclosure relates to an engine including a charge air cooler.

BACKGROUND AND SUMMARY

Turbocharged and supercharged engines may be configured to compress ambient air entering the engine in order to increase power. Because compression of the air may cause an increase in air temperature, a charge air cooler may be utilized to cool the heated air thereby increasing its density and further increasing the potential power of the engine. If the humidity of the ambient air is high, however, condensation (e.g., water droplets) may form on internal surfaces of the charge air cooler that are cooler than the dew point of the compressed air. During transient conditions such as hard vehicle acceleration, these water droplets may be blown out of the charge air cooler and into the combustion chambers of the engine resulting in increased potential for engine misfire, loss of torque and engine speed, and incomplete combustion, for example.

The inventors have recognized the above issues and offer an approach to at least partly address them. In one embodiment, an engine method comprises increasing intake air flow velocity through a charge air cooler in response to an estimated condensation formation value within the charge air cooler.

In this way, during conditions where condensation is likely to form, intake air flow velocity through the charge air cooler may be increased to break surface tension and prevent the formation of condensation within the charge air cooler. In one example, the charge air cooler may include a valve configured to open during low-condensation conditions (e.g., high intake air flow velocity), allowing the intake air to flow through the entire volume of the charge air cooler. The valve may be configured to close during high-condensation conditions (e.g., low intake air flow velocity), blocking the intake air from flowing through the entire charge air cooler and instead directing the intake air through a portion of the charge air cooler. By routing the intake air through only a portion of the volume of the charge air cooler instead of the entire volume, intake air flow velocity increases and the formation of condensation within the charge air cooler decreases.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
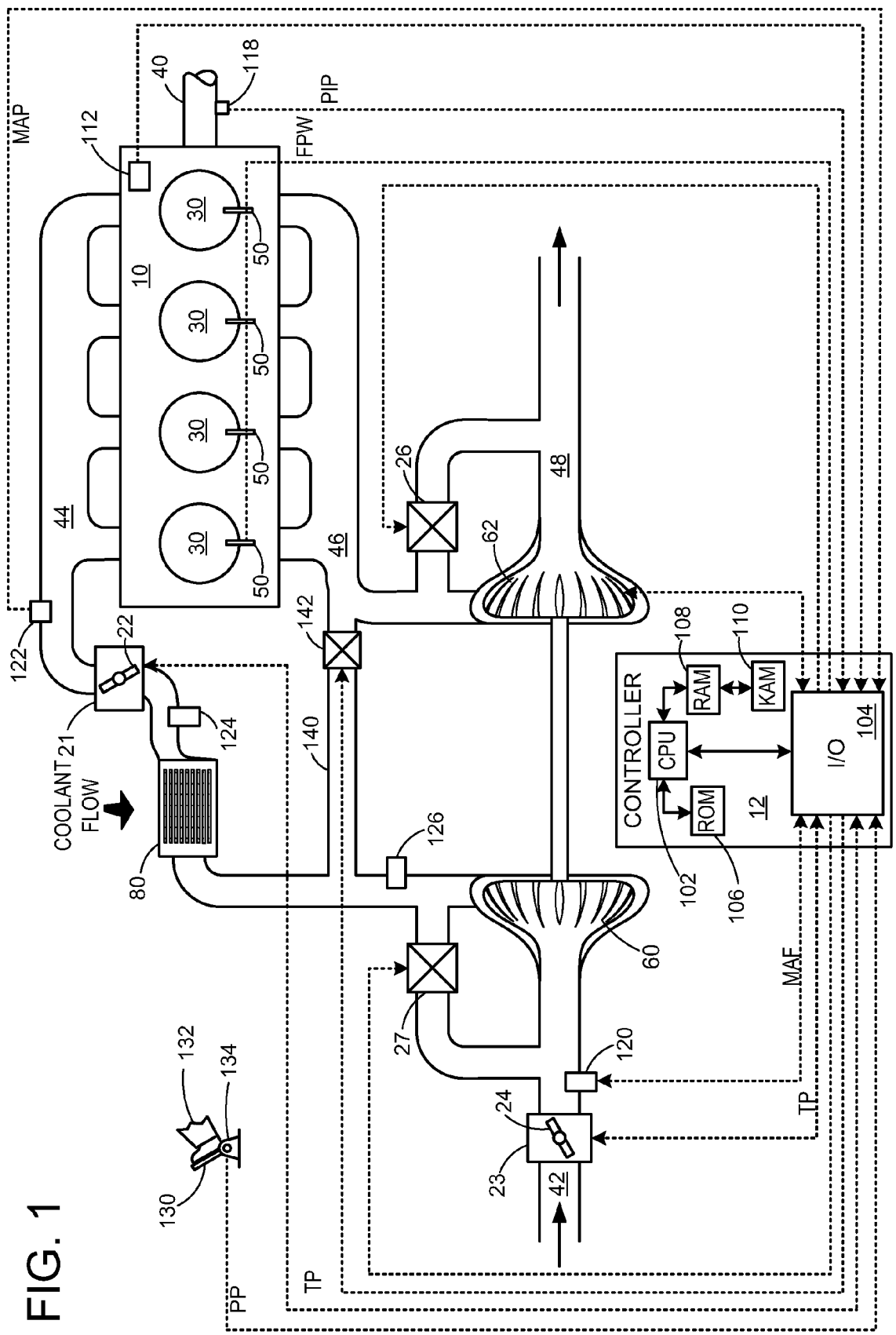
FIG. 1 is a schematic diagram of an example engine including a charge air cooler.
Figure 2A:
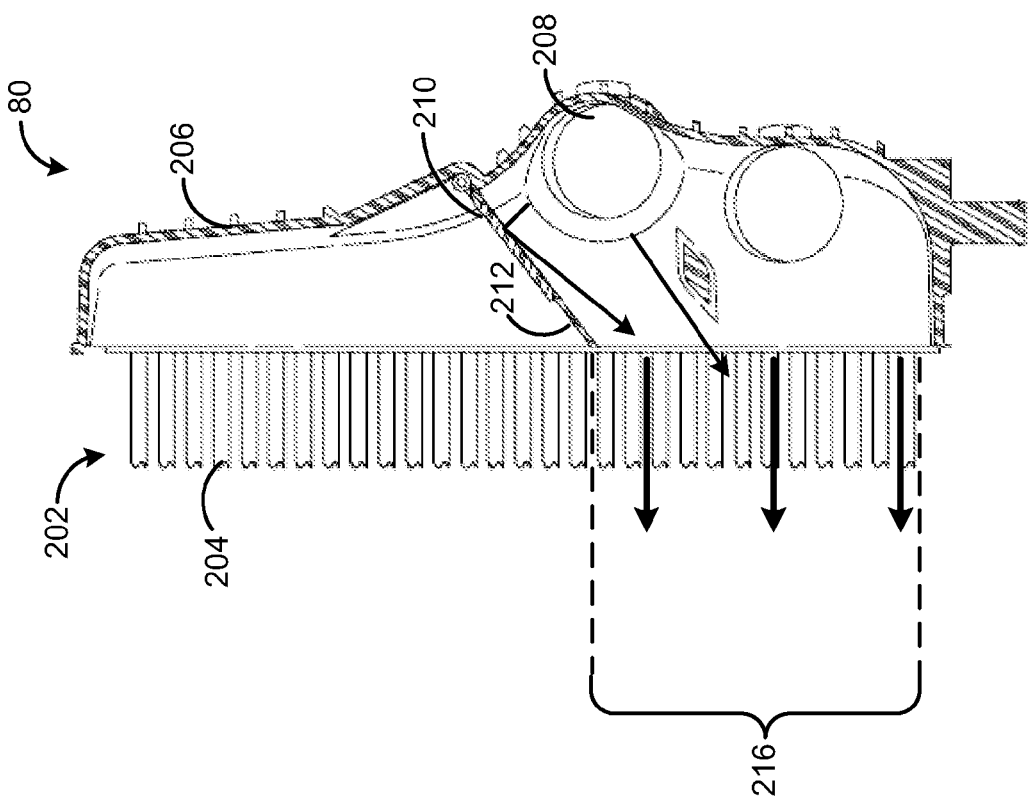
FIG. 2A shows a schematic diagram of an inlet portion of an example charge air cooler intake including a valve in an open position.

Condensation formation in a charge air cooler may be detrimental to the engine, as the introduction of the condensate to the cylinders during combustion may cause combustion instability and/or misfire. Further, condensation formation may degrade the charge air cooler, particularly if accumulated condensate freezes during an extended engine-off period. To reduce the accumulation of condensation, a valve positioned in the inlet of the charge air cooler may be closed to selectively route the intake air through a sub-section of the charge air cooler to increase the velocity of the intake air, relative to the velocity of the intake air when it travels through an entirety of the charge air cooler. The valve may be opened or closed in response to a condensation formation value, which provides an estimate of the likelihood that condensation will form within the charge air cooler. FIG. 1 is a diagram of an engine system including a charge air cooler. The charge air cooler inlet valve is shown in FIG. 2A in its open position and in FIG. 2B in its closed position. The engine system of FIG. 1 also includes a controller configured to carry out the methods depicted in FIGS. 3-6. The controller of FIG. 1 may also include one or more maps stored thereon, such as the map depicted in FIG. 7.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42. For example, as depicted in FIG. 1, an additional throttle 23 having a throttle plate 24 is located upstream of compressor 60.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge-air-cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. As described in more detail below, charge air cooler 80 may include a valve to selectively modulate the flow velocity of intake air traveling through the charge air cooler 80 in response to condensation formation within the charge air cooler.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, ignition system, etc.

Figure 2B:
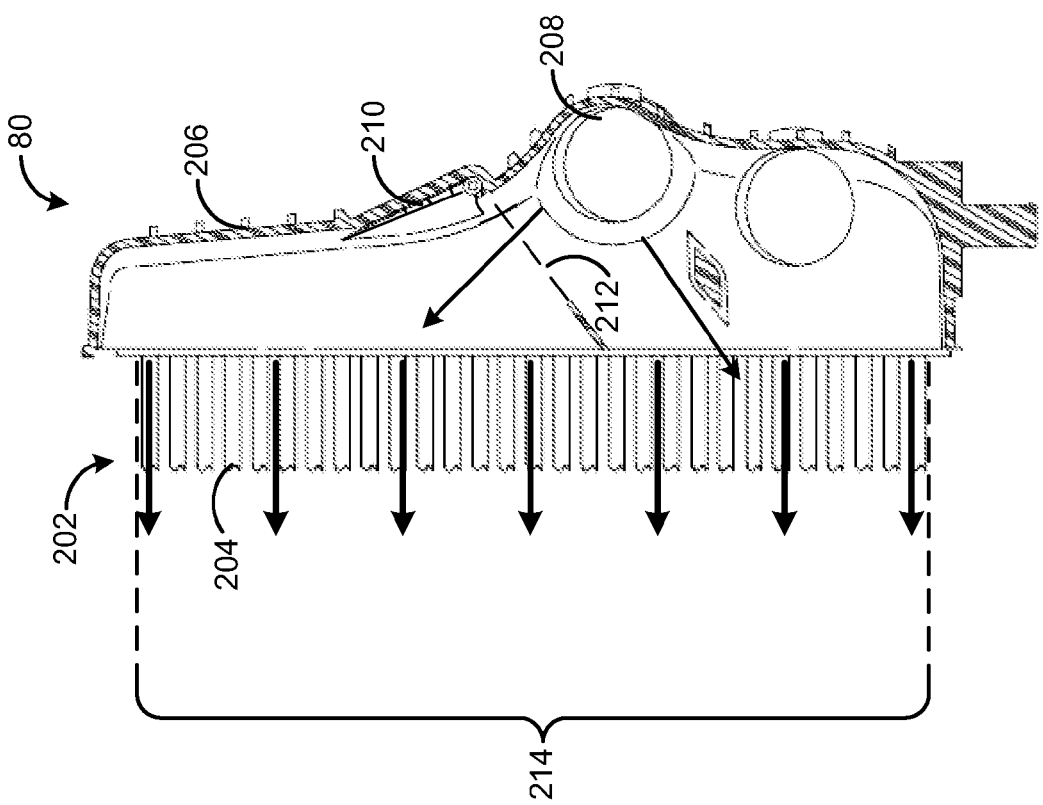
FIG. 2B shows a schematic diagram of the charge air cooler intake of FIG. 2A with the valve in a closed position.

Turning now to FIGS. 2A and 2B, an inlet side of charge air cooler 80 is depicted. As depicted in both FIGS. 2A and 2B, charge air cooler 80 includes an operable thermal transfer area 202 configured to transfer heat from inside the charge air cooler 80 to outside of the charge air cooler 80. The charge air cooler 80 includes a plurality of cooling tubes 204 located in the thermal transfer area 202 of charge air cooler 80. The plurality of cooling tubes 204 are in fluidic communication with an inlet tank 206. Inlet tank 206 is configured to receive intake air via one or more inlet passages 208 coupled to an upstream region of an intake passage (not shown in FIGS. 2A and 2B). The intake air flows from the inlet tank 206 to the plurality of cooling tubes 204. After passing through the cooling tubes 204, the intake air is routed through an outlet tank (not shown) coupled to a downstream region of the intake passage. The charge air cooler 80 may also include a charge air cooler valve 210 configured to change the operable thermal transfer area from a first volume 214 (shown in FIG. 2A) comprising a relatively large area to second volume 216 (shown in FIG. 2B) comprising a relatively small area.

Inlet tank 206 may include a divider 212 that partitions inlet tank 206 into a first portion and a second portion. Divider 212 may include one or more holes. FIG. 2A depicts valve 210 in an open position. When valve 210 is open, intake air may pass through one or more holes of divider 212 such that intake air flows through both the first and second portions of inlet tank 206 and through the first volume 214 of the charge air cooler 80. Substantially all of the plurality of cooling tubes 204 may define the first volume 214. In one example, the charge air cooler 80 may include 21 cooling tubes, and the first volume 214 may include all 21 cooling tubes.

FIG. 2B depicts valve 210 in the closed position. When closed, valve 210 blocks the one or more holes of divider 212. Thus, intake air only flows through the first portion of the inlet tank 206 and through the second volume 216 of the charge air cooler 80. A portion of the plurality of cooling tubes 204 may define the second volume 216. The second volume 216 is contained wholly within the first volume 214. That is, the cooling tubes that comprise the second volume 216 also comprise a portion of the first volume 214. Therefore, when valve 210 is closed, intake air flows through only the second volume 216, and when valve 210 is open, intake air flows through the first volume 214, which contains the second volume 216. In one example, the charge air cooler 80 may include 21 cooling tubes, and the second volume 216 may include less than 21 cooling tubes. The second volume 216 may include less than half the cooling tubes that comprise the first volume 214, such as 9 cooling tubes.

The valve 210 may be, or may be similar to, a flapper valve. The valve 210 may include a seat member (e.g., divider 212) comprising a substantially flat stationary member having one or more holes there through. A closure member, for example a flap, or plate may be configured to move a first position spaced from the seat member thereby opening the one or more holes wherein intake air is able to flow into the first volume 214, to a second position adjacent to the seat member thereby closing the one or more holes wherein intake air is able to flow into only the second volume 216.

The divider 212 may be part of the valve 210. For example, the divider 212 may be a valve seat. The divider 212 may also be a dividing line or datum, or the like, functionally dividing the charge air cooler 80 into the two portions. Some embodiments may include two or more dividers dividing the inlet into three or more portions. In some examples one or more configurations described herein regarding the inlet tank 206 may instead, or in addition, be included in an outlet tank (not shown). Substantially all of the plurality of cooling tubes 204 may be in mutual fluidic communication with the outlet tank. It will be understood that instead, all the tubes may be in fluid communication on the inlet side and divided at the outlet side into two or more portions of tubes. A similarly configured valve may also be included in the outlet tank and function to control whether the fluid is allowed to pass or prevented from passing through a similarly configured hole.

Various embodiments may include an actuator (not illustrated) to open and to close the valve 210. The actuator may be one or more of: an electronic actuator, a vacuum controlled actuator, a mechanical pressure diaphragm, a pulse-width modulated electronic control. When the inlet air is allowed to pass through all the tubes of the charge air cooler, i.e. when the valve is open, the inlet air will also experience a drop in pressure and the valve will be exposed on both sides to the pressure of the incoming inlet air. In this way the actuator may only need to provide a motive force to open and to close the valve in order to change the valve from an open state to a close state, but may not need to provide force to keep the flap open or to keep the flap closed.

Figure 3:
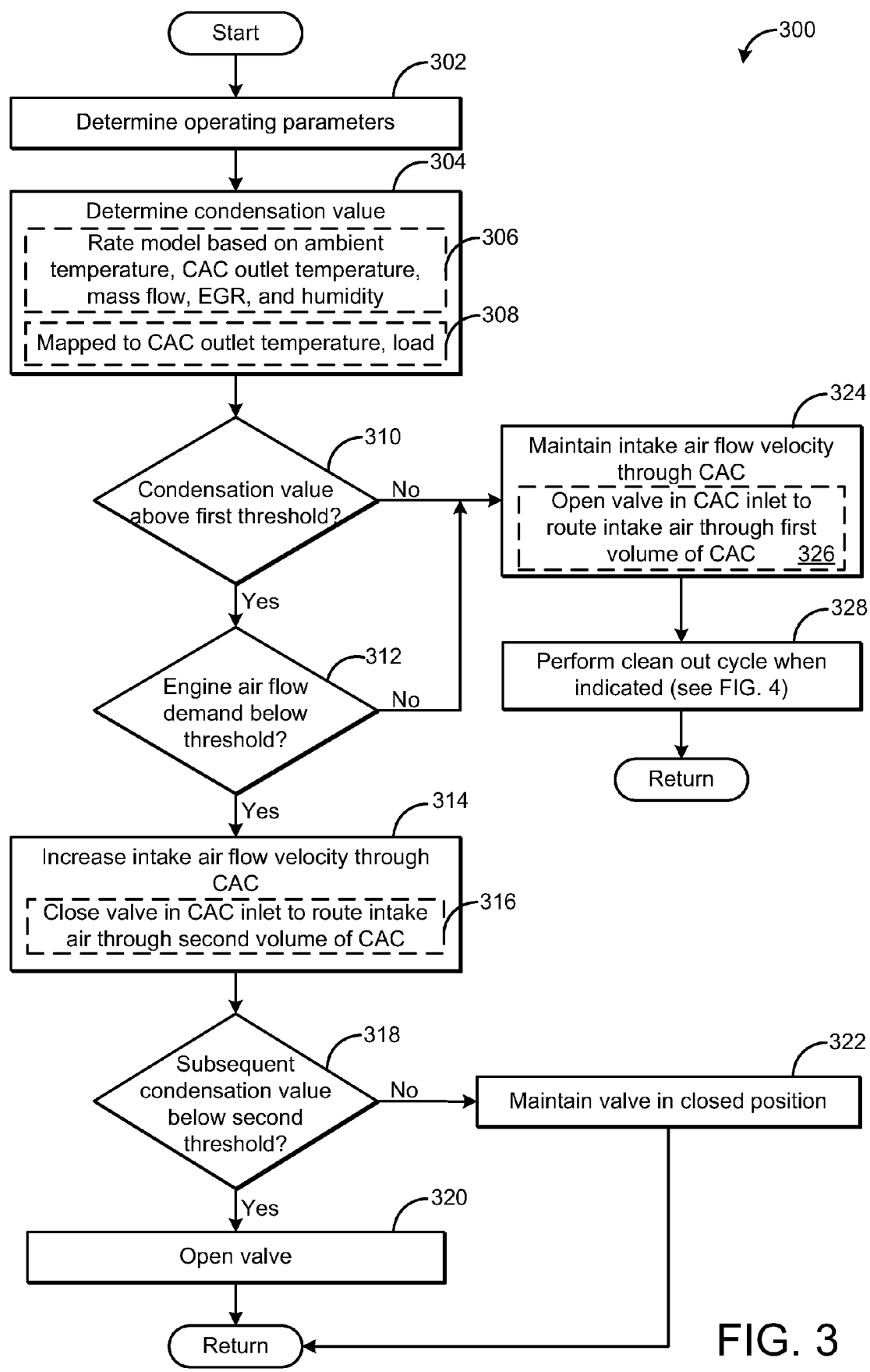
FIG. 3 is a flow chart illustrating a method for controlling air flow through a charge air cooler according to an embodiment of the present disclosure.

Thus, FIGS. 2A and 2B depict a charge air cooler configured to selectively direct intake air through either a first, larger volume or a second, smaller volume via modulation of a valve arranged in the charge air cooler. In some embodiments, the valve may be mechanically modulated based on intake air flow, e.g., the valve flap or plate may be kept closed by spring tension that is calibrated to match air flow, such that the valve flap opens under conditions of high air flow. Thus, during low air flow conditions, the intake air may be directed through the second volume of the charge air cooler, increasing the intake air flow velocity through the cooler to prevent condensation accumulation. In other embodiments, the valve may be controlled by a controller, such as controller 12 of FIG. 1, based on various operating conditions. For example, the valve may be open during low condensation formation conditions and commanded closed during conditions of high condensation formation. FIG. 3 is a flow chart illustrating a method 300 that may be carried out by a controller according to instructions stored thereon to regulate the position of the valve in the charge air cooler based on condensation formation.

At 302, method 300 includes determining engine operating conditions. The determined engine operating conditions may include engine speed and load, ambient temperature, MAF, MAP, EGR amount, humidity, and other parameters. At 304, a condensation formation value is determined from the operating conditions. The condensation formation value may be an indicator of the likelihood that condensation will form within the charge air cooler. In some embodiments, the condensation formation value may be the intake air flow velocity determined based on the MAF signal, for example. In another embodiment, the condensation formation value may be the difference between the dew point of the intake air, determined based on the humidity of the intake air and ambient temperature, and the temperature of the charge air cooler.

Both of the above embodiments for determining a condensation value estimate the likelihood of condensation formation based one or two simple factors. However, multiple factors may influence condensation formation within the charge air cooler, such as both the velocity of the air flow and the dew point of the intake air. To provide for an indication of condensation formation with increased accuracy, determining the condensation value may include determining a condensation formation rate based on a model at 306. The model may include inputs of ambient temperature, charge air cooler outlet temperature, mass air flow, EGR flow, and humidity. If the humidity is not known (for example, if the engine does not include a humidity sensor), the humidity may be set to 100%. As explained above, the ambient temperature and humidity may provide an indication of the dew point of the intake air, which may be further affected by the amount of EGR in the intake air (e.g., EGR may have a different humidity and temperature than the air from the atmosphere). The difference between the dew point and the charge air cooler outlet temperature indicates whether condensation will form within the cooler, and the mass air flow may affect how much condensation actually accumulates within the cooler. The condensation formation rate itself may be the condensation formation value. In other embodiments, the condensation formation rate may be used to determine an amount of condensation that has accumulated during a given time period, and the condensation amount may be the condensation formation value.

A simpler mechanism for determining a condensation value may include a condensation formation value that is mapped to charge air cooler outlet temperature and engine load at 308. Engine load may be a function of air mass, torque, accelerator pedal position, and throttle position, and thus may provide an indication of the air flow velocity through the charge air cooler. For example, a moderate engine load combined with a relatively cool charge air cooler outlet temperature may indicate a high condensation formation value, due to the cool surfaces of the charge air cooler and relatively low intake air flow velocity. The map may include a modifier of ambient temperature.

At 310, method 300 includes determining if the condensation formation value exceeds a first threshold. The threshold may be dependent on how the condensation value was determined at 304. For example, if the condensation formation value is intake air flow velocity, the threshold may be a suitable intake air flow velocity above which the surface tension of the accumulated condensation may break, enabling the condensation to be entrained with the air flow. If the condensation formation value is the difference between the dew point of the intake air and the charge air cooler temperature, the threshold may be zero. If the condensation formation rate is determined as the formation value, it may be compared to a threshold condensation formation rate. If the condensation formation value is determined based on the temperature/load map, the map may provide a numerical value (e.g., between 0-1) indicative of the likelihood of condensation, and this may be compared a threshold.

In some embodiments, the first threshold may be a threshold above which condensation forms and below which condensation does not form. In this way, any indication of condensation may be above the threshold. However, in other embodiments, the first threshold may be set such that a small amount of condensation is allowed to accumulate.

If the condensation formation value does not exceed the first threshold, method 300 proceeds to 324, which will be explained in more detail below. If the formation value does exceed the first threshold, method 300 proceeds to 312 to determine if the engine air flow demand is below a threshold. When the condensation formation value exceeds the first threshold, a valve in the charge cooler may be closed to increase intake air flow velocity and remove and/or prevent condensation accumulation in the charge air cooler. However, when the valve is closed, the pressure drop across the charge air cooler increases, limiting air flow to the intake of the engine via the charge air cooler. Thus, the valve in the charge air cooler may be closed dependent on the air flow demands of the engine such that the valve is kept open if the air flow demands are high, to avoid a disturbance in torque. The air flow demand of the engine may be determined based on engine speed and load, manifold pressure, etc. The threshold air flow demand may be based on the amount of air the charge air cooler is configured to pass when the valve is closed.

If the engine air flow demand is not below the threshold, method 300 proceeds to 324, explained in more detail below. If the air flow demand is below the threshold, method 300 proceeds to 314 to increase the intake air flow velocity through the charge air cooler. As explained above, increasing the intake air flow velocity may prevent condensation accumulation by entraining the condensate within the air flow. Increasing the intake air flow velocity includes closing the valve in the inlet of the charge air cooler to route the intake air through the second, smaller volume of the charge air cooler at 314.

A new condensation formation value may be determined following closing of the valve, and at 318, it is determined if the subsequent condensation formation value is below a second threshold. In some embodiments, the second threshold may be equal to the first threshold. However, in other embodiments, particularly if the intake air flow velocity is the condensation formation value, the second threshold may be lower than the first threshold. If the subsequent condensation formation value is below the second threshold, the valve may be opened at 320; if the condensation formation value is not below the second threshold, the valve is kept closed at 322. In this way, the condensation formation value may be continually monitored and the valve modulated accordingly. By setting the first and second thresholds to be different, frequent switching around the first threshold may be avoided, particularly when the condensation formation value is intake air velocity as the opening of the valve will cause a drop in intake air flow velocity.

Returning to 310, if the condensation formation value is not above the first threshold, method 300 proceeds to 324 to maintain intake air flow velocity, which includes, at 326, opening the valve in the inlet of the charge air cooler (or maintaining the valve in the open position) to route the intake air through the first, larger volume of the charge air cooler. During extended operation with the valve in the open position and intake air flowing through the first volume of the charge air cooler, proactive cleaning cycles may be carried out. Thus, at 328, method 300 includes performing a clean out cycle if indicated, which will be described in more detail with respect to FIG. 4.

Figure 4:
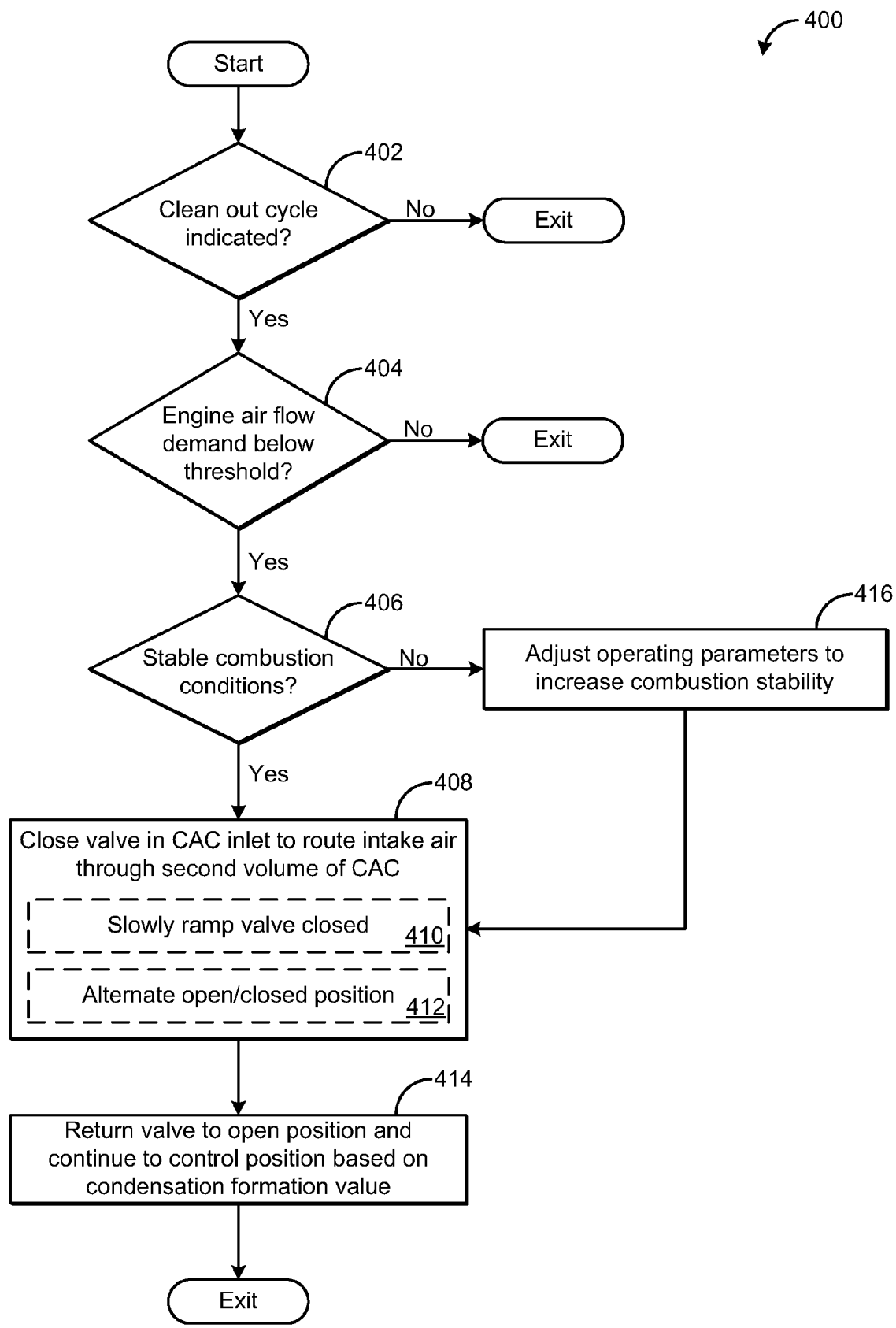
FIG. 4 is a flow chart illustrating a method for performing a clean out cycle of a charge air cooler according to an embodiment of the present disclosure.

FIG. 4 illustrates a method 400 for performing a clean out cycle of the charge air cooler. Method 400 may be carried out during the execution of method 300 of FIG. 3, for example it may be periodically carried out when the valve in the charge air cooler inlet is in the open position. Method 400 includes, at 402, determining if a charge air cooler clean out cycle is indicated. As described above with respect to FIG. 3, when the condensation formation value is not above the threshold, increasing the intake air flow velocity may not be necessary to prevent condensation formation, but under certain conditions, the valve may be closed proactively to clean out the charge air cooler. The conditions for initiating a clean out cycle may include extended operation with the valve in the charge air cooler being in the open position, which may lead to gradual accumulation of condensation within the charge air cooler that periodically necessitates removal.

If a clean out cycle is not indicated, method 400 exits. If a clean cycle is indicated, method 400 proceeds to 404 to determine if the engine air flow demand is below a threshold, similar to the air flow demand determination described above with respect to FIG. 3. If the air flow demand is not below the threshold, the reduction in volume of the charge air cooler will reduce the air flow to the intake below the air flow demand, reducing torque. Thus, the clean out cycle is not carried out, and method 400 exits.

If the air flow demand is below the threshold, method 400 proceeds to 406 to determine if the engine is operating with high combustion stability conditions. During the clean out cycle, a slug of condensate may travel to the engine, which can cause misfire or other unstable combustion events. To mitigate the unstable combustion events, the clean out cycle may only be carried out when combustion stability is high so that the condensate, if present in large enough amounts, may be tolerated by the engine. The stable combustion conditions may include low load, steady state conditions with no or low EGR. If high combustion stability conditions are not present, method 400 may include, at 416, adjusting operating parameters to increase combustion stability. For example, the amount of EGR may be reduced. However, in some embodiments, rather than commanding adjustments to operating parameters in order to increase combustion stability, method 400 may instead include waiting until the vehicle is operating with high combustion stability before carrying out the clean out cycle.

Once the vehicle is operating with high combustion stability, method 400 proceeds to 408 to close the valve in the inlet of the charge air cooler to route intake air through the second volume of the charge air cooler. In contrast to when the valve is closed in response to a condensation formation value, during the clean out cycle, the valve may be controlled in such a manner as to avoid a sudden removal of condensate to the engine. This may include, at 410, slowly ramping the valve closed. Rather than quickly moving the valve and causing a fast increase in the intake air velocity through the charge air cooler, the valve may be slowly closed to gradually increase the intake air velocity. In doing so, the condensate may gradually be routed to the engine. Alternatively or additionally, the valve may be switched between the open and closed position at 412 to clean out the condensate in short bursts rather than in one large amount. Other mechanisms of closing the valve to avoid a sudden removal of the condensate are also possible.

At 414, upon completion of the clean out cycle (such as after the valve has been closed for a threshold amount of time), the valve is returned to the open position, and control of the valve position continues to be based on the condensation formation value, as described above.

Thus, the methods described above with respect to FIGS. 3 and 4 provide for selectively routing intake air through a first volume or a second volume of a charge air cooler based on a difference between an intake air dew point and a charge air cooler temperature, the second volume being a portion of the first volume. Routing the intake air through the first volume comprises opening a valve in the inlet of the charge air cooler, and routing the intake air through the second volume comprises closing the valve in the inlet of the charge air cooler. The intake air may be routed through the first volume when the difference between the dew point and the charge air cooler temperature is below a threshold. The intake air may be routed through the second volume when the difference exceeds the threshold. The second volume is contained within the first volume, such that the first volume comprises the second volume and an additional volume.

The methods also provide for when a condensation formation value is below a threshold, cooling intake air via a first volume of a charge air cooler, and when the condensation formation value is above the threshold, cooling the intake air via a second volume of the charge air cooler, the second volume being a subset of the first volume. Cooling the intake air through the first volume comprises opening a valve in the inlet of the charge air cooler, and cooling the intake air through the second volume comprises closing the valve in the inlet of the charge air cooler. A plurality of cooling tubes may be located within the charge air cooler, and the first volume may comprise substantially all of the cooling tubes. The second volume may comprise less than half of the cooling tubes. In some embodiments, the condensation formation value may be estimated based on mass air flow, ambient temperature, charge air cooler outlet temperature, humidity and an EGR amount. In other embodiments, the condensation formation value may be estimated based on engine load and charge air cooler outlet temperature. The valve in the inlet of the charge air cooler may be opened under low engine load in order to provide maximum cooling to the intake air. Under higher loads, such as medium load, the valve may be closed to prevent condensation accumulation. Under maximum load, the valve may be opened to provide maximum cooling to the intake air.

The system and methods described above provide for opening or closing a charge air cooler valve based on condensation conditions within the charge air cooler. When the valve is closed, air flow through the charge air cooler is restricted to a smaller volume. This reduced air flow through the charge air cooler may result in a torque disturbance, as a smaller-than-expected amount of air is delivered to the intake of the engine. To compensate for the change in air flow through the charge air cooler, additional operating parameters may be adjusted to maintain requested torque.

Figure 5:
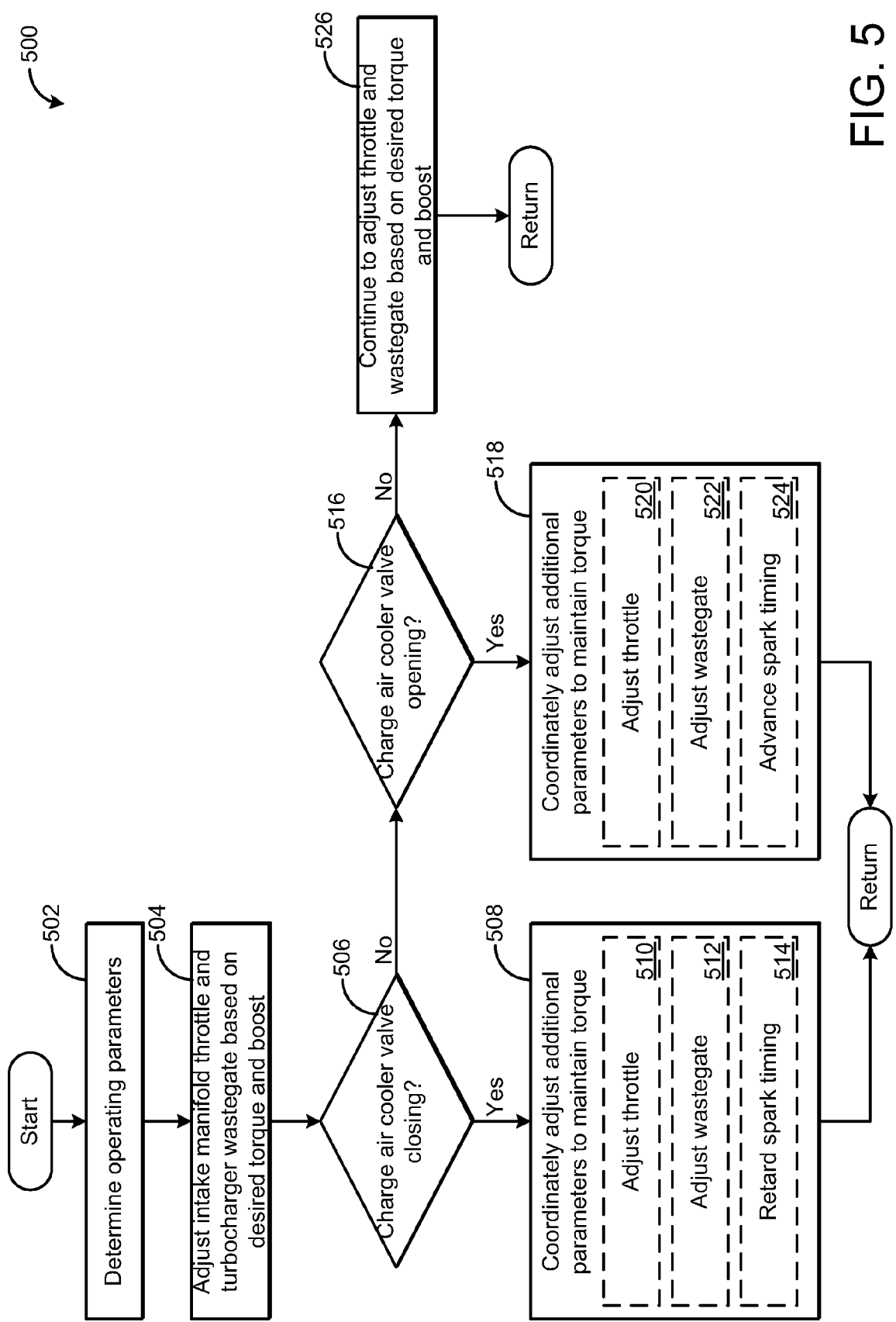
FIG. 5 is a flow chart illustrating a method for adjusting additional operating parameters during the adjustment of the charge air cooler valve according to an embodiment of the present disclosure.

FIG. 5 is a flow chart illustrating a method 500 for adjusting additional operating parameters in response to an adjustment of the charge air cooler valve. Method 500 may be carried out by controller 12 according to instructions stored thereon. Method 500 includes, at 502, determining engine operating parameters. Engine operating parameters may include engine speed and load, engine temperature, a position of the charge air cooler valve, condensation conditions within the charge air cooler, and other parameters.

At 504, intake manifold throttle position and turbocharger wastegate position may be adjusted based on desired torque and boost level. As explained above with respect to FIG. 1, the throttle (such as throttle 21) may be adjusted according to operator request in order to deliver desired torque, and the wastegate (e.g., wastegate 26) position may be adjusted based on mass air flow through the turbocharger turbine, in order to maintain a desired level of boost and/or prevent turbocharger surge or over speed events.

At 506, method 500 includes determining if the charge air cooler valve (such as valve 210) is currently being closed. Determining if the charge air cooler valve is being closed may include determining if the charge air cooler is about to be closed, for example by determining if the operating conditions indicate the valve is to be closed, or if a command has been sent to close the valve. As explained previously, the charge air cooler valve may be closed when conditions in the charge air cooler indicate that condensation may accumulate in the charge air cooler. Additionally, the charge air cooler valve may be closed in response to other parameters, such as compressor surge, explained below with respect to FIGS. 6 and 7.

If the charge air cooler valve is being closed, method 500 proceeds to 508 to coordinately adjust additional parameters to maintain torque. Adjusting additional parameters may include adjusting the throttle position at 510. The initial throttle position may be set based on driver-requested torque, as explained above. In one example, when the charge air cooler valve is closed, the throttle may be adjusted to be in a less-restricted position (e.g., more open) in order to prevent further limitations on the air flow to the intake. Adjusting the additional parameters may also include adjusting the wastegate position at 512. Under some conditions, the reduced air flow through the charge air cooler may be compensated by increasing boost pressure. For example, the boost pressure may be increased by closing the wastegate in order to direct all exhaust through the turbine, increasing the compression of the intake air. At 514, adjusting the additional parameters may include retarding spark timing. If the torque disturbance caused by the closing of the charge air cooler valve is not compensated by the adjustments to the throttle and wastegate, the spark timing may be adjusted to further control the amount of torque. In some embodiments, the spark timing may be retarded prior to the closing of the charge air cooler and then advanced back to the predetermined timing once the valve has closed.

Returning to 506, if it is determined that the charge air cooler is not closing or about to close, method 500 proceeds to 516 determine if the charge air cooler valve is opening (of if the valve is about to be opened). If the valve is opening, method 500 proceeds to 518 to coordinately adjust operating parameters to maintain toque. When the valve is opened, a larger-than-expected amount of air may flow to the intake, causing an increase in torque. To maintain toque at the driver-requested level, additional operating parameters may be adjusted along with the opening of the charge air cooler valve. The adjusted parameters may include adjusting the throttle at 520, adjusting the wastegate at 522, and advancing spark timing at 524. In one example, the throttle may be closed and the wastegate may be opened to counteract the increase in torque caused by the opening of the charge air cooler valve. The closing of the throttle, opening of the wastegate, and advancing spark timing may be performed prior to the charge air cooler valve opening, or may be performed as the valve is opening.

Returning to 516, if it is determined that the charge air cooler valve is not opening or about to open, method 500 proceeds to 526 to continue to adjust throttle and wastegate position based on desired torque and boost level. If the valve is not opening or closing but is instead in a steady position, no torque disturbances from the charge air cooler are present, and thus the throttle and wastegate may be adjusted based on torque and boost level, respectively, rather than adjusted to account for the air flow disturbances from the charge air cooler. Method 500 then returns.

While the examples listed above include opening the throttle and closing the wastegate in response to the charge air cooler valve being closed, under some conditions the throttle may be closed and/or the wastegate may be opened when the charge air cooler valve is closed. For example, during a transient operating event (such as a decrease engine load), the throttle may be briefly closed in order to deliver the requested air flow during the transient event. Similarly, under some conditions, the throttle may be opened and/or the wastegate may be closed when the charge air cooler valve is opened.

Thus, method 500 provides for an engine method comprising increasing intake air flow velocity through the a charge air cooler, and coordinately adjusting a position of one or more of an intake manifold throttle and a turbocharger wastegate in response to the increased intake air flow velocity to maintain torque. Increasing intake air flow velocity may include closing a valve arranged in an inlet of the charge air cooler to direct air flow through a subset of the charge air cooler, and coordinately adjusting the position of one or more of the intake manifold throttle and the turbocharger wastegate may include one of opening the intake manifold throttle and closing the turbocharger wastegate as the valve closes. The intake air flow velocity may be increased in response to an estimated condensation formation value within the charge air cooler, and the condensation formation value may be estimated based on mass air flow, ambient temperature, charge air cooler outlet temperature, and an EGR amount.

Further, when the estimated condensation formation value is below a threshold, the valve may be open to direct air flow through an entirety of the charge air cooler, and the intake manifold throttle may be closed and the turbocharger wastegate may be opened as the valve opens. Spark timing may be adjusted prior to or as the valve closes.

In another embodiment, an engine method comprises selectively routing intake air through a first volume or a second volume of a charge air cooler based on a difference between an intake air dew point and a charge air cooler temperature, the second volume being a portion of the first volume, and as the intake air is routed between the first and second volumes of the charge air cooler, adjusting one or more of an intake manifold throttle and a turbocharger wastegate position to maintain torque.

The intake air may be routed through the first volume of the charge air cooler when the difference is greater than a threshold, and routed through the second volume of the charge air cooler when the difference is less than a threshold. To route air through the first volume of the charge air cooler, a valve arranged in an inlet of the charge air cooler may be opened, and the valve arranged in the inlet of the charge air cooler may be closed to route air through the second volume of the charge air cooler. The intake manifold throttle may be opened and the turbocharger wastegate may be closed when closing the valve and the throttle may be closed and the wastegate opened when opening the valve.

In a further embodiment, an engine method comprises when a condensation formation value is below a threshold, cooling intake air via a first volume of a charge air cooler by opening a valve arranged in an inlet of the charge air cooler, and when the condensation formation value is above the threshold, cooling the intake air via a second volume of the charge air cooler by closing the valve, the second volume being a subset of the first volume. As the valve is opened or closed, one or more of an intake manifold throttle and turbocharger wastegate may be coordinately adjusted to maintain torque. Similar to the above embodiments, the throttle may be opened and the wastegate may be closed when the valve is closed and the throttle may be closed and the wastegate may be opened when the valve is opened.

As explained above, the charge air cooler valve may be adjusted in response to compressor operation in a surge region. Compressor surge may result from low air flow through the compressor; under certain conditions, such as a driver tip-out event, the flow rate and pressure ratio across the compressor can fluctuate to levels that may result in noise disturbances, and in more severe cases, performance issues and compressor degradation. To mitigate such surge events, volume downstream of the compressor may be decreased by closing the charge air cooler valve when the compressor is operating near a surge level.

Figure 6:
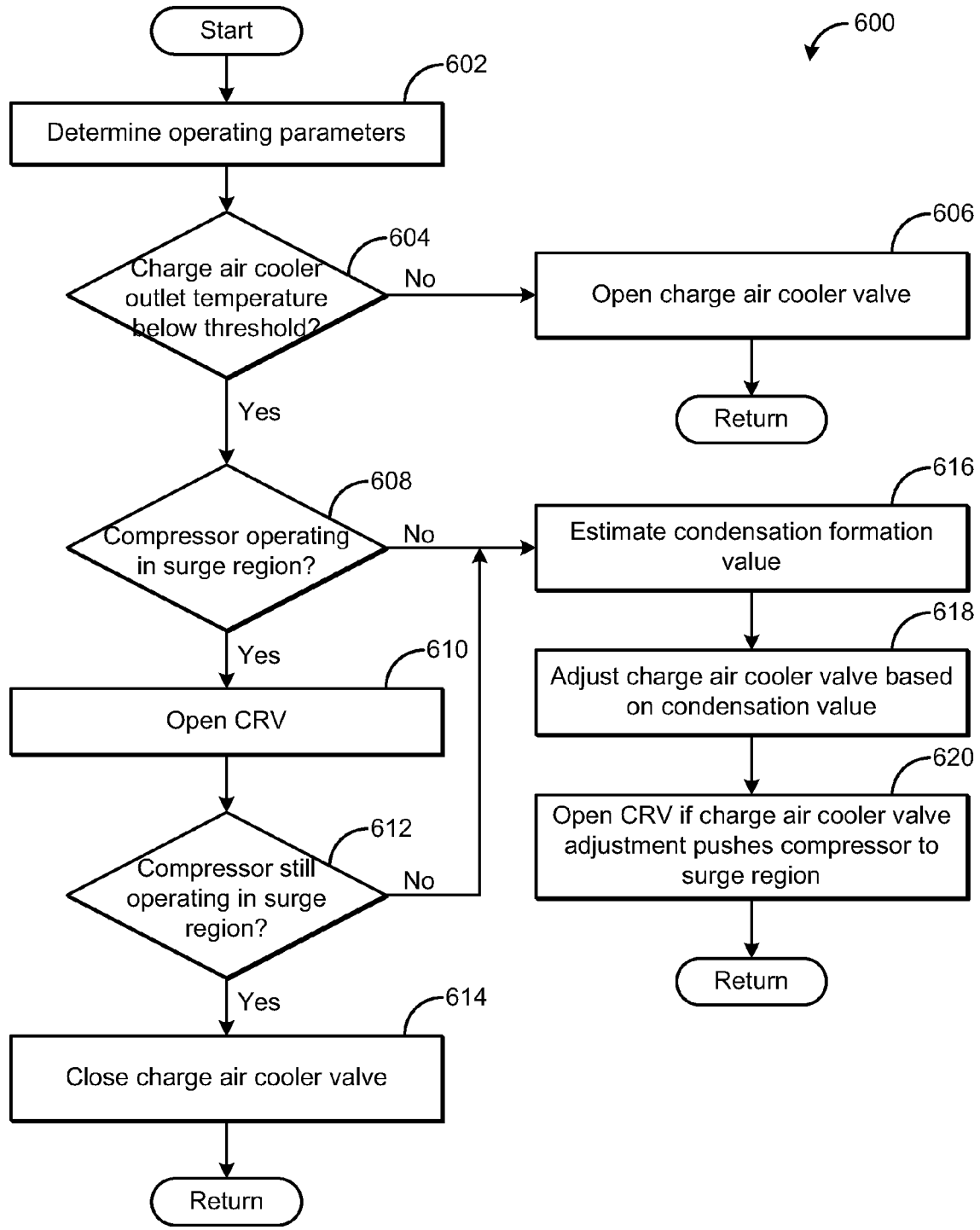
FIG. 6 is a flow chart illustrating a method for controlling turbocharger surge according to an embodiment of the present disclosure.

FIG. 6 is a flow chart illustrating a method 600 for adjusting a charge compressor valve (such as valve 210) in response to compressor operation in a surge region. As used herein and explained in more detail below, the term "surge region" includes compressor operating points that result in surge (beyond a surge level, for example) as well as operating points near a surge level that do not result in surge (but that may push the compressor to surge when small air flow fluctuations occur). Additionally, the compressor may be considered to be operating in the surge region if it is predicted that the compressor would enter surge at or while transitioning to the next requested operating point. Method 600 may be carried out by controller 12.

At 602, method 600 includes determining engine operating parameters, such as engine speed and load, boost pressure, mass air flow through the compressor, compressor pressure ratio, etc. At 604, it is determined if the outlet temperature of the charge air cooler is below a threshold. If the temperature is not below the threshold, method 600 proceeds to 606 to open the charge air cooler valve. When the temperature at the outlet of the charge air cooler exceeds a high temperature threshold, the valve may be opened to provide maximum air flow, and thus maximum cooling, through the charge air cooler.

If the charge air cooler outlet temperature is below the threshold, method 600 proceeds to 608 to determine if the compressor is currently operating or is predicted to operate in a surge region. The surge region of the compressor is a function of compressor pressure ratio (e.g., boost pressure) and air flow through the compressor. The pressure ratio and air flow through the compressor may be mapped to a compressor operating map, which indicates if the compressor is operating at surge. Alternatively, compressor operation in the surge region may be determined based on engine speed and load. Further, even if the compressor is not currently operating with surge, subsequent operation with surge may be predicted based on the next requested operating point. For example, if a tip-out event or other drop in engine speed or load has occurred, it may be predicted that the air flow through the compressor is about to decrease, and thus it may be estimated that the compressor is going to operate in the surge region.

Figure 7:
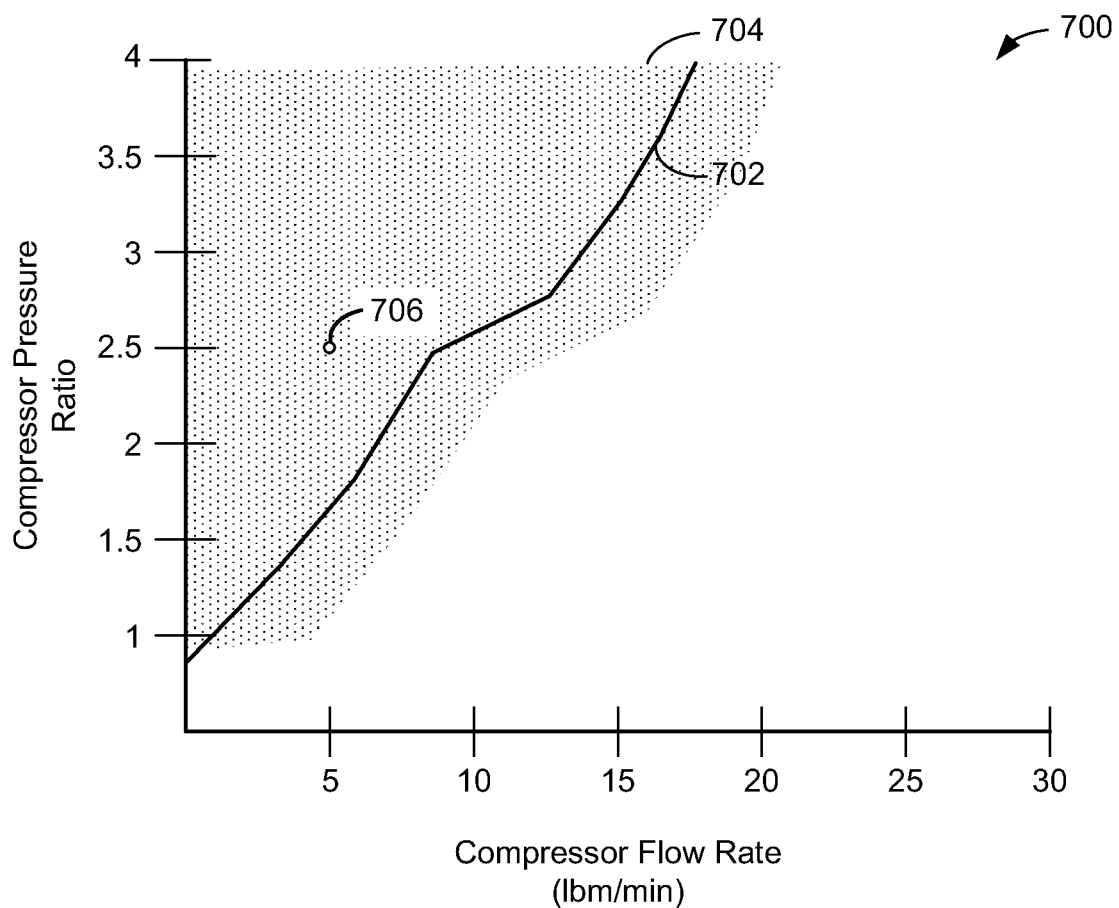
FIG. 7 is an example map illustrating a surge region according to an embodiment of the present disclosure.

An example compressor operating map 700 is depicted in FIG. 7. Flow rate through the compressor is depicted on the x-axis while the pressure ratio of the compressor is depicted on the y-axis. An example surge line is indicated by line 702. The pressure-flow coordinates to the left of the surge line 702 are in the surge region 704, where conditions are of low enough flow and high enough pressure to cause compressor surge. Additionally, the pressure-flow coordinates immediately to the right of the surge line 702 may also be in the surge region 704, as they may be so close to the surge line that minor fluctuations in compressor flow may push the compressor into surge, and thus proactive measures may be taken to avoid surge when the pressure-flow coordinates are within this area. All compressor operating points not within the surge region 704 may be a non-surge region. The surge line and surge region of map 700 are presented as examples, as the surge regions of various turbochargers may differ depending on turbocharger parameters, such as size.

In one example, at a pressure ratio of 2.5 and flow rate of 5 lbm/min, indicated by dot 706, surge may occur. To avoid surge, the flow rate through the compressor may be increased to the reach the surge line, for example it may be increased by approximately 4 lbm/min to 9 lbm/min, to avoid surge. Alternatively or additionally, to prevent surge, one or more compressor recirculation valves (CRVs) may be opened and/or the charge air cooler valve may be closed, as explained below.

Returning to method 600 of FIG. 6, if it is determined at 608 that the compressor is operating in a surge region or if it is predicted that the compressor will operate in the surge region, method 600 proceeds to 610 to open the CRV (e.g., CRV 27) in order to increase flow through the compressor. At 612, it is determined if the compressor is still operating or predicted to operate within the surge region. If yes, method 600 proceeds to 614 to close the charge air cooler valve. By closing the charge air cooler valve, the volume downstream of the compressor is reduced, which may decrease the compressor's propensity to surge at a given operating condition. If the compressor is no longer operating or predicted to operate within the surge region, method 600 proceeds to 616, which will be discussed below.

Returning to 608, if it is determined that the compressor is not operating within the surge region, method 600 proceeds to 616 to estimate a condensation formation value, as discussed above. At 618, the charge air cooler valve may be adjusted based on the estimated condensation formation value. For example, if the condensation value is above a threshold, the valve may be closed, and if the condensation value is below the threshold, the valve may be opened. If the charge air cooler valve is opened, for example, the change in volume downstream of the compressor may increase the compressor's propensity to surge. Thus, at 620, the CRV may be opened if the adjustment to the charge air cooler valve pushes the compressor towards surge. The CRV may include a plurality of restriction levels, such that it may be opened in a continuously variable manner. The position of the CRV may be coordinated with the volume change of the charge air cooler to reduce compressor pressure ratio and increase flow to prevent surge. Alternatively, the CRV may be an on/off valve that may only be opened or closed, and a model may be used to predict when the compressor is going to reach the surge region, and the CRV may be opened based on the model-predicted surge operation. In some embodiments, the CRV may be opened only if the compressor is able to meet the boost demand of the engine with the CRV open. Additionally, in some embodiments, surge control may be further provided by adjusting the throttle, and maintaining requested torque by adjusting spark timing, camshaft position, etc. Method 600 then returns.

While method 600 adjusts the charge air cooler to control surge after the CRV has been opened, other arrangements are possible. For example, the charge air cooler valve may be adjusted anytime the compressor operates in the surge region, and the CRV valve may be adjusted only if the compressor is still operating in the surge region. In another example, both the CRV and the charge air cooler valve may be adjusted in a coordinated manner when operation in the surge region is detected. Furthermore, under some conditions, the charge air cooler valve may adjusted to provide both surge avoidance and condensation control. For example, if condensation conditions indicate that the charge air cooler valve is to be closed and if the compressor is operating with surge, the charge air cooler valve may be preferentially adjusted instead of or in addition to the CRV. Conversely, if the compressor is operating in surge yet the condensation conditions indicate that the charge air cooler valve is to be opened, the CRV may be initially used to control surge, and if the compressor is still operating with surge, then the charge air cooler valve may be closed. The controller may be configured to prioritize condensation management, surge control, and engine air flow and cooling demands in order to determine whether the charge air cooler valve is to be opened or closed.

Thus, method 600 provides for an engine method comprising under a first condition, adjusting a volume of a charge air cooler based on a compressor surge condition, and under a second condition, adjusting the volume of the charge air cooler based on an estimated condensation formation value within the charge air cooler. In some embodiments, the first and second conditions may be mutually exclusive, such that the charge air cooler volume is adjusted based only on the compressor surge condition or only on the condensation formation value. Such conditions may include current or predicted compressor operation in a surge region as the first condition, and compressor operation in a non-surge region as the second condition. However, in other embodiments, the first and second conditions may not be mutually exclusive.

The volume of the charge air cooler may be adjusted by adjusting a charge air cooler valve arranged in an inlet of the charge air cooler. For example, when the estimated condensation formation value is below a threshold, the charge air cooler valve may be opened to direct air flow through an entirety of the charge air cooler, and when the estimated condensation formation value is above the threshold, the charge air cooler valve may be closed to direct air flow through a subset of the charge air cooler. In another example, when the current or predicted compressor operation is within a surge region, the volume of the charge air cooler may be decreased by closing the charge air cooler valve.

A compressor recirculation valve may be adjusted when the charge air cooler valve is adjusted. If the position of the charge air cooler valve is adjusted based on the estimated condensation formation value, the position of the compressor recirculation valve may be adjusted to avoid compressor surge. Under some conditions, the adjustment to the charge air cooler valve to avoid surge and/or to control condensation may be overridden. For example, the charge air cooler valve may be opened if the charge air cooler outlet temperature is above a threshold, in order to provide maximum cooling to the charge air.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
increasing intake air flow velocity through a charge air cooler (CAC) by adjusting a valve arranged within an inlet tank inside the CAC to route intake air flow through only a portion of an entire volume of the CAC in response to an estimated condensation formation value within the CAC, the portion and a remaining portion of the entire volume both having cooling tube inlets positioned within the inlet tank and coupled to a same intake air inlet passage.

2. The engine method of claim 1, wherein increasing intake air flow velocity further comprises closing the valve arranged within the inlet tank of the CAC to direct air flow through the portion of the entire volume of the CAC and block air flow from flowing through the remaining portion of the entire volume of the CAC, the cooling tube inlets of the portion and the remaining portion being adjacent each other, wherein the inlet tank is an inlet tank of the entire volume, and wherein the adjusting the valve includes automatically adjusting the valve with a controller.

3. The engine method of claim 2, wherein the valve is a flapper valve and wherein increasing intake air flow velocity through the CAC in response to the estimated condensation formation value within the CAC further comprises closing the flapper valve to cover a hole in a divider dividing the inlet tank of the CAC into the portion and the remaining portion in order to increase intake air flow velocity through the CAC and block air flow from flowing into the cooling tube inlets of the remaining portion of the entire volume of the CAC in response to the estimated condensation formation value being above a threshold.

4. The engine method of claim 3, further comprising, when the estimated condensation formation value is below the threshold, opening the valve arranged within the inlet tank of the CAC to direct air flow through the entire volume of the CAC via all of the cooling tube inlets of the CAC.

5. The engine method of claim 4, wherein the intake air flow velocity is increased through the portion of the entire volume of the CAC relative to intake air flow velocity through the entire volume of the CAC.

6. The engine method of claim 1, wherein the condensation formation value is estimated based on mass air flow, ambient temperature, CAC outlet temperature, and an EGR amount.

7. The engine method of claim 6, wherein the condensation formation value is adjusted based on input from a humidity sensor.

8. The engine method of claim 1, wherein the condensation formation value is estimated based on engine load and CAC outlet temperature.

9. An engine method, comprising:
selectively routing intake air from an inlet passage through a first volume or a second volume of a charge air cooler (CAC) with a valve arranged within an inlet tank inside the CAC based on a difference between an intake air dew point and a CAC temperature, the second volume being a portion of the first volume and the second volume sharing some cooling tube inlets positioned within the inlet tank of the first volume of the CAC, the shared cooling tube inlets being adjacent to remaining cooling tube inlets of the first volume, positioned within the inlet tank, and coupled to a same intake air inlet passage.

10. The engine method of claim 9, further comprising routing intake air through the first volume of the CAC when the difference is greater than a threshold.

11. The engine method of claim 9, further comprising routing intake air through the second volume of the CAC when the difference is less than a threshold.

12. The engine method of claim 9, further comprising opening the valve arranged within the inlet tank of the first volume of the CAC to route air through the first volume of the CAC and to an outlet tank of the CAC, wherein the opening the valve is controlled by a controller.

13. The engine method of claim 9, further comprising closing the valve arranged within the inlet tank of the CAC to route air through the second volume of the CAC and block air from flowing through a remaining portion of the first volume, wherein the closing the valve is controlled by a controller.

14. An engine method, comprising:
when a condensation formation value is below a threshold, cooling intake air via a first volume of a charge air cooler (CAC) by adjusting a valve arranged within an inlet tank inside the CAC; and
when the condensation formation value is above the threshold, cooling the intake air via a second volume of the CAC, the second volume being a subset of the first volume and the first volume and the second volume both having cooling tube inlets positioned within the inlet tank of the first volume and coupled to a same intake air inlet passage of the CAC, the inlet tank receiving intake air from the same intake air inlet passage and the inlet tank including a divider dividing the inlet tank into a first portion and a second portion.

15. The engine method of claim 14, wherein adjusting the valve includes automatically adjusting the valve with a controller and wherein cooling intake air via the first volume further comprises opening the valve arranged within the inlet tank inside the CAC to allow intake air to pass through one or more holes of the divider such that intake air flows through both the first and second portions of the inlet tank and through the first volume of the CAC.

16. The engine method of claim 15, wherein cooling intake air via the second volume further comprises closing the valve arranged within the inlet tank to block the one or more holes of the divider and only flow intake air through the first portion of the inlet tank and through the second volume of the CAC.

17. The engine method of claim 14, further comprising a plurality of cooling tubes located within the CAC, wherein the first volume comprises substantially all of the cooling tubes, and wherein the first volume and the second volume are cooled by a same coolant flow.

18. The engine method of claim 17, wherein the second volume comprises less than half of the cooling tubes and further comprising flowing intake air from the inlet tank of the CAC, through the cooling tubes, and to an outlet tank of the CAC, the inlet tank including a valve for routing the intake air through the first volume and the second volume.

19. The engine method of claim 14, wherein the condensation formation value is estimated based on mass air flow, ambient temperature, CAC outlet temperature, humidity, and an EGR amount.

20. The engine method of claim 14, wherein the condensation formation value is estimated based on engine load and CAC outlet temperature.

* * * * *